US007309025B2

(12) United States Patent
Yamazaki et al.

(10) Patent No.: US 7,309,025 B2
(45) Date of Patent: Dec. 18, 2007

(54) FUEL INJECTION METHOD

(75) Inventors: Shigeru Yamazaki, Odawara (JP); Hirokazu Hirosawa, Odawara (JP)

(73) Assignee: Mikuni Corporation, Tokyo (JP)

( * ) Notice: Subject to any disclaimer, the term of this patent is extended or adjusted under 35 U.S.C. 154(b) by 460 days.

(21) Appl. No.: 10/532,987

(22) PCT Filed: Oct. 30, 2003

(86) PCT No.: PCT/JP03/13909

§ 371 (c)(1),
(2), (4) Date: Apr. 28, 2005

(87) PCT Pub. No.: WO2004/040113

PCT Pub. Date: May 13, 2004

(65) Prior Publication Data

US 2005/0284950 A1 Dec. 29, 2005

(30) Foreign Application Priority Data

Oct. 30, 2002 (JP) ............................ 2002-316708

(51) Int. Cl.
*F02D 1/06* (2006.01)
*A01G 27/00* (2006.01)
*F02M 47/02* (2006.01)
*F02M 59/00* (2006.01)
*B05B 1/30* (2006.01)

(52) U.S. Cl. ............................ 239/5; 239/67; 239/69; 239/88; 239/93; 239/95; 239/533.2; 239/585.1; 239/585.2; 239/585.3; 239/585.4; 239/585.5

(58) Field of Classification Search .................... 239/5, 239/1, 67–69, 88, 89, 91–95, 533.1, 533.2, 239/533.3, 533.15, 585.1–585.5
See application file for complete search history.

(56) References Cited

U.S. PATENT DOCUMENTS 4,242,729 A 12/1980 Weber et al.
4,345,564 A * 8/1982 Kawamura et al. ......... 123/490

(Continued)

FOREIGN PATENT DOCUMENTS

CA 1 134 010 10/1982

(Continued)

*Primary Examiner*—Davis D. Hwu
(74) *Attorney, Agent, or Firm*—Wenderoth, Lind & Ponack, L.L.P.

(57) ABSTRACT

A fuel injection method is provided for correcting the fuel injection amount accurately by eliminating offset components when detecting a current flowing through a solenoid for fuel injection. A current component, which is detected during normal running and a drive current flowing through the solenoid for fuel injection is OFF (Step 11), is input to an A/D converter that stores the value thereof (Step 12). Thereafter, the drive current is turned ON (Step S13), elapse of a fixed time period is waited (Step S14), and an input voltage of the A/D converter is detected (Step S15). A difference current (offset component) is calculated by subtracting the offset voltage from the input voltage (Step S16), and a current span is adjusted based on a span correction factor (Step S17). Thereafter, a pulse width current correction factor is calculated (Step S2*a*) and, based on the pulse width current correction factor, a drive pulse width is calculated (Step S2*b*) and provided to the solenoid.

5 Claims, 11 Drawing Sheets

U.S. PATENT DOCUMENTS

| | | | | |
|---|---|---|---|---|
| 5,499,608 | A | 3/1996 | Meister | |
| 5,954,030 | A * | 9/1999 | Sturman et al. | 123/446 |
| 6,420,817 | B1 * | 7/2002 | Ricci-Ottati et al. | 310/316.01 |
| 6,910,644 | B2 * | 6/2005 | Nakayama et al. | 239/585.5 |

FOREIGN PATENT DOCUMENTS

| | | |
|---|---|---|
| GB | 1038541 | 8/1966 |
| JP | 58-28537 | 2/1983 |
| JP | 58-107827 | 6/1983 |
| JP | 62-18804 | 1/1987 |
| JP | 63-106484 | 5/1988 |
| JP | 63-223350 | 9/1988 |
| JP | 2002-4921 | 1/2002 |

* cited by examiner (DRIVE CURRENT OFF)

(DRIVE CURRENT ON)

FUEL INJECTION METHOD

TECHNICAL FIELD

The present invention relates to an electronically controlled fuel injection method for supplying fuel to engines. More particularly, the present invention relates to a fuel injection method for injecting fuel accurately without being affected by variations in supply voltage or in coil resistance of a solenoid included in a fuel injector.

BACKGROUND ART

FIG. 8 is a diagram of a correction control system in a conventional fuel injector. In the control system, a supply voltage VB of a supply terminal 11 is input to a microcomputer 13 in an electronic control unit (hereinafter, "ECU") via a supply voltage input circuit 12.

When the supply voltage VB is low, the microcomputer 13 provides a field effect transistor (hereinafter, "FET") driver 15 with a pulse having such a waveform that elongates the on-time period of an FET 14. As a result, a coil current flows through a solenoid 16 for a longer time to elongate a fuel injection time. When the supply voltage VB is high, to the contrary, the fuel injection time is shortened to keep the fuel injection amount unchanged. Immediately after the FET 14 is turned from ON to OFF, the current flowing through the solenoid 16 is redirected to a zener diode 18 via a diode 17. As a result, the drain voltage of the FET 14 is equalized to the voltage of the zener diode 18, which consumes power to halt fuel injection.

FIG. 9 is a diagram of a constant current control system in a conventional fuel injector. In the control system, the supply voltage VB of the supply terminal 11 is detected by a supply voltage detector 21. The coil current is detected at a current detection resistor 22 by a current detector 23 additionally provided for current detection. The microcomputer 13 and a constant current driver 24 control the coil current not to vary even if the supply voltage VB varies.

The conventional art for correcting the fuel injection amount by detecting variations in the supply voltage is disclosed, for example, in Japanese Patent Application Laid-open No. S58-28537. The conventional art for correcting the fuel injection amount by detecting the supply voltage and the drive current flowing through the solenoid is disclosed, for example, in Japanese Patent Application Laid-Open No. 2002-4921.

In the correction control system based on the supply voltage VB as shown in FIG. 8, however, the resistance of the coil in the solenoid 16 fluctuates with increased temperature of the coil, to change the coil current even if the supply voltage VB is unchanged. Therefore, it is difficult to correct the fuel injection amount accurately.

In contrast, the constant current control system shown in FIG. 9 can control the coil current unchanged even if the temperature of the coil varies. In this case, however, it causes an increase in the number of components due to the complex controller and an increase in software processing.

FIG. 10 is a diagram of an internal circuit of the current detector 23 shown in FIG. 9. FIG. 11 is a diagram for explaining the influence of offset voltages on current detection. As shown, the drive current generates a voltage of the current detector 23 (an offset voltage between the current detection resistor 22 and the current detector 23: Vinoffset); an offset voltage of an operational amplifier 25 in the current detector 23 (Vopoffset); and an offset voltage of an analog to digital (hereinafter, "A/D") converter 26 in the microcomputer 13 (Vadoffset). The offset voltage between the current detection resistor 22 and the current detector 23 (Vinoffset) and the offset voltage of the operational amplifier 25 in the current detector 23 (Vopoffset) increase according to the amplification factor of the operational amplifier 25.

Thus, as shown in FIG. 11, the input voltage of the A/D converter 26 (Vadin) includes an additional offset component voltage (Vadinoffset) other than a voltage generated by an inherent drive current component (Vadini). The offset component voltage (Vadinoffset) occupies a proportion not negligible to deteriorate the accuracy of the current detection and interfere with precise fuel injection control.

The present invention is made in view of the above problems, and its object is to provide a fuel injection method for precise correction of the fuel injection amount by eliminating the offset component that are generated when detecting the current flowing through the solenoid for fuel injection.

DISCLOSURE OF THE INVENTION

To solve the above problems and achieve the object, a fuel injection method according to claim 1 includes: starting driving of a solenoid for fuel injection; detecting a coil current before starting driving of the solenoid; detecting a coil current when driving the solenoid; calculating a difference current between the coil current detected when driving the solenoid and the coil current detected before starting driving of the solenoid; correcting a width of a drive pulse for driving the solenoid based on the difference current calculated; and halting driving of the solenoid.

According to the invention described in claim 1, the offset component can be detected by calculating difference current between coil currents respectively detected before and after every driving the solenoid, to correct the drive pulse width accurately by eliminating the offset component.

A fuel injection method according to claim 2 further includes adjusting the difference current based on a predetermined span correction factor after calculating the difference current. In the injection method, the width of the drive pulse is corrected based on the difference current adjusted.

According to the invention described in claim 2, an appropriate current span can be set to correct the drive pulse width accurately.

In a fuel injection method according to claim 3, the detecting the coil current before starting driving of the solenoid is executed for every driving of the solenoid to correct the width of the drive pulse for every driving of the solenoid.

According to the invention described in claim 3, the offset component can be eliminated for every driving of the solenoid that generates the offset component, to correct the drive pulse stably for long periods by eliminating the influence of temperature drift.

A fuel injection method according to claim 4 further includes calculating a span correction factor when adjusting a product. In the fuel injection method, the calculating a span correction factor includes calculating a span correction factor based on coil currents that are respectively detected before and after flowing a predetermined current through the solenoid.

According to the invention described in claim 4, the current span can be calculated for each product to correct the drive pulse width accurately using the current span of each product.

A fuel injection method according to claim 5 further includes storing the span correction factor calculated in a rewritable storage unit.

According to the invention described in claim 5, appropriate offset correction can be performed immediately after product shipment using the span correction factor of each product stored in the storage unit at the shipment and kept in the product in an appropriate state.

BEST MODE FOR CARRYING OUT THE INVENTION

Figure 1:
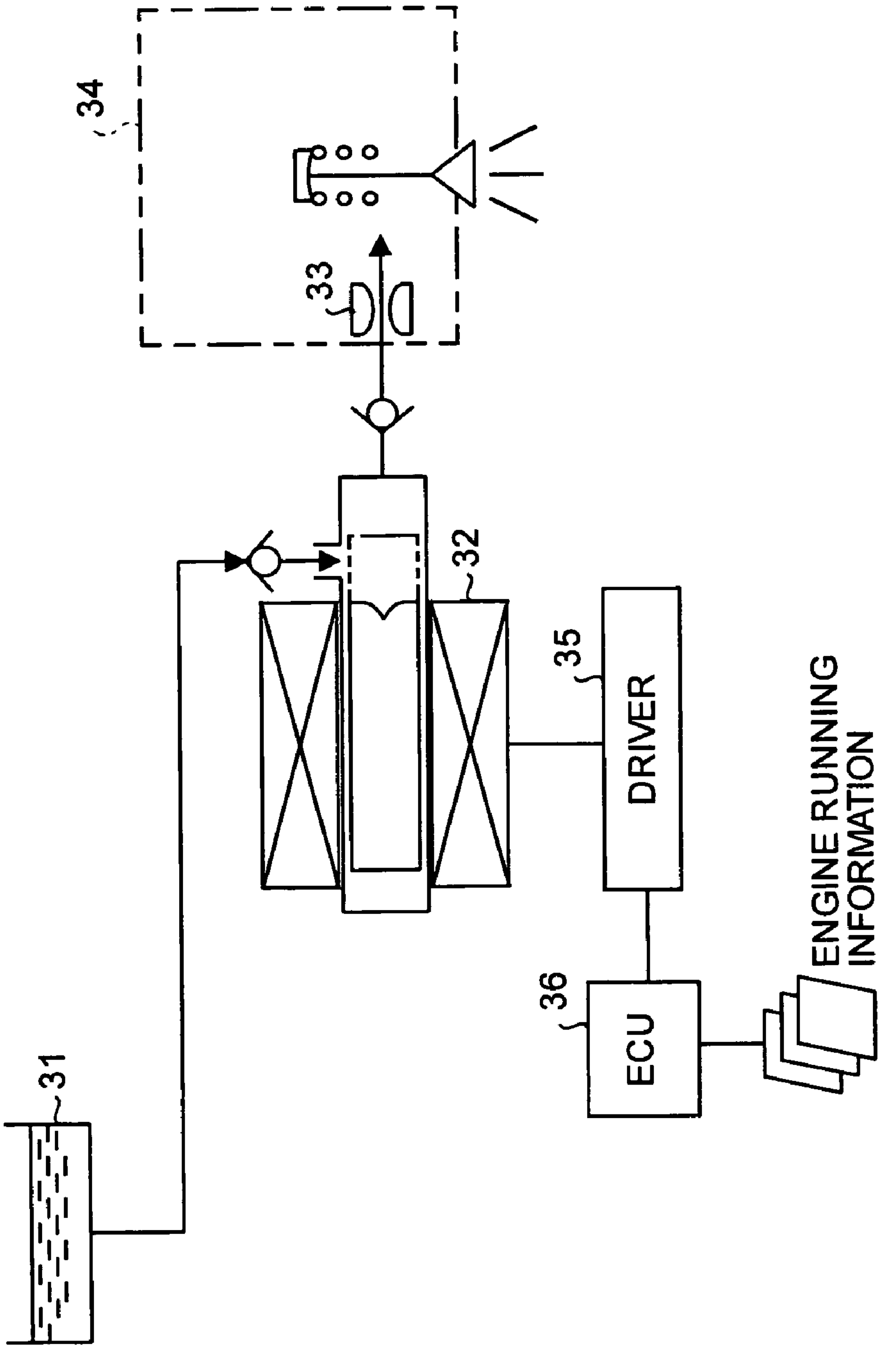
FIG. 1 is a diagram illustrating a brief arrangement of the electromagnetic fuel injection pump system applying the method of fuel injection according to the present invention.

Exemplary embodiments of the present invention will be described below in detail, with reference to the drawings. First explained is a configuration of an electromagnetic fuel injection pump system applying a fuel injection method according to the present invention. FIG. 1 is a diagram of the overall configuration of the electromagnetic fuel injection pump system applying the fuel injection method according to the present invention.

As shown in FIG. 1, the electromagnetic fuel injection pump system includes the following basic constituents 31 to 36, for example. A plunger pump 32 serves as an electromagnetic driving pump that can press-send fuel from inside a fuel tank 31. An inlet orifice nozzle 33 has an orifice that allows the fuel pressurized under a certain pressure and sent from the plunger pump 32 to pass therethrough. An injection nozzle 34 injects the fuel into an intake manifold (in an engine) when the fuel passing through the inlet orifice nozzle 33 is pressurized under a certain pressure or more. A driver 35 and an electronic control unit (ECU) 36 send control signals to the plunger pump 32 and so forth based on engine running information and a value of the coil current flowing through a solenoid of the plunger pump 32.

Figure 2:
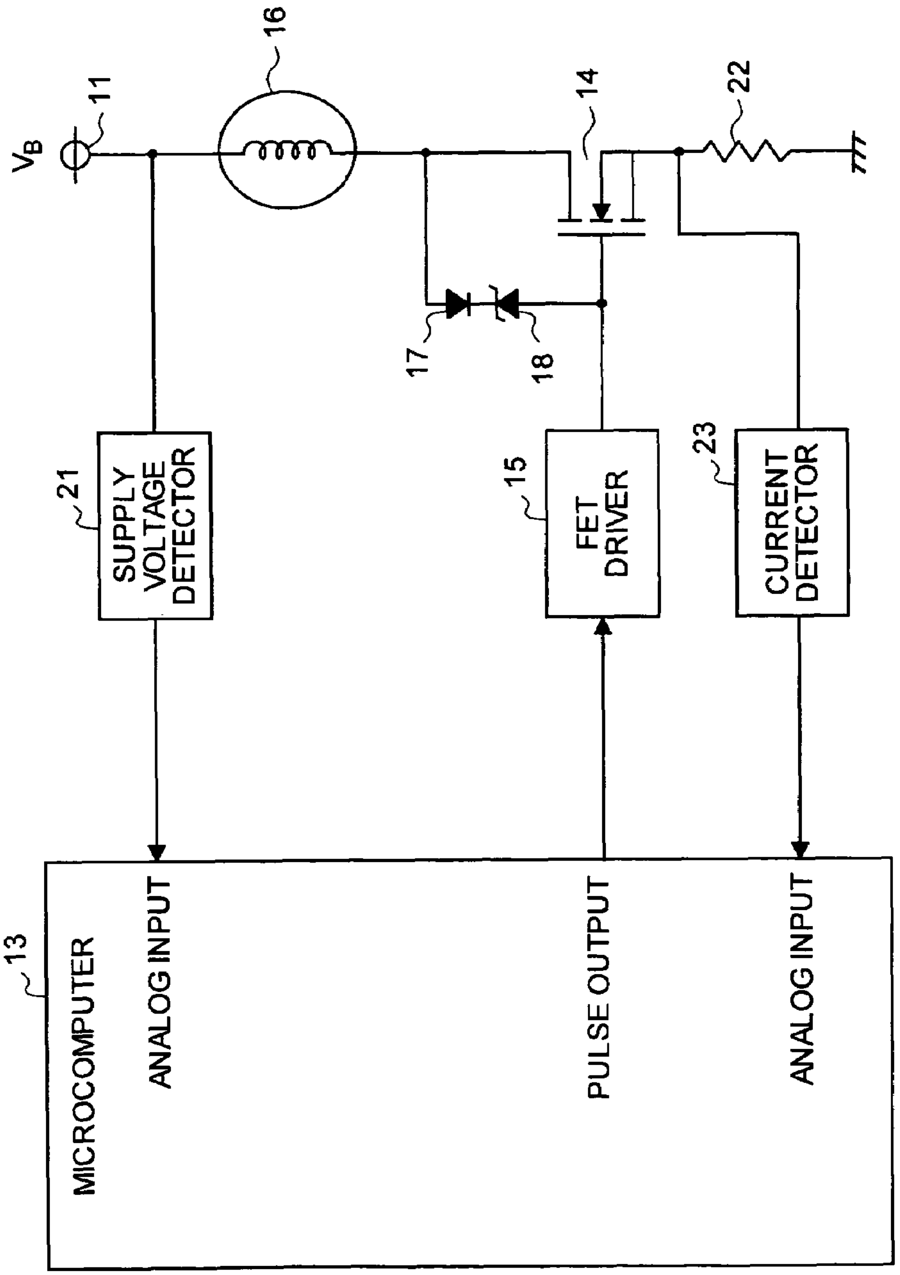
FIG. 2 is an illustrative view of a control mechanism in the electromagnetic fuel injection pump system applying the method of fuel injection according to the embodiment of the present invention.

FIG. 2 is a diagram of a control mechanism in the electromagnetic fuel injection pump system applying the fuel injection method according to the embodiment of the present invention. The solenoid 16 shown in FIG. 2 is included in the plunger pump 32. The FET 14 (for example, N-channel FET), which serves as a switching element for driving the solenoid 16, is included in the driver 35. The FET driver 15, the supply voltage detector 21, the current detection resistor 22, the current detector 23, the diode 17, and the zener diode 18 are also included in the driver 35.

When the FET 14 is turned from ON to OFF, the zener diode 18 equalizes the drain voltage of the FET 14 with the voltage of the zener diode 18 to consume the solenoid current. The ECU 36 contains the microcomputer 13.

The supply voltage detector 21 detects the supply voltage VB and feeds the detected value to the microcomputer 13. One end of the solenoid 16 is connected to the supply terminal 11, to which the supply voltage VB is applied. The other end of the solenoid 16 is connected to the drain of the FET 14 and to the gate of the FET 14 via the diode 17 and the zener diode 18. Based on the control signal output from the microcomputer 13, the FET driver 15 generates a drive pulse and feeds it to the gate of the FET 14.

The source of the FET 14 is grounded via the current detection resistor 22. When the drive pulse turns the FET 14 on, a current (coil current) flows from the supply terminal 11 through the FET 14 and the current detection resistor 22 to the ground terminal to drive the solenoid 16. The value of the current flowing through the current detection resistor 22 is fed as a voltage signal to the current detector 23, which detects the current based on the input voltage. The detected signal output from the current detector 23 is fed into the microcomputer 13 and converted into a digital signal at the A/D converter 26 to execute correction of the drive pulse. The internal configuration of the current detector 23 is same as that shown in FIG. 10, and accordingly its explanation is omitted.

Figure 3:
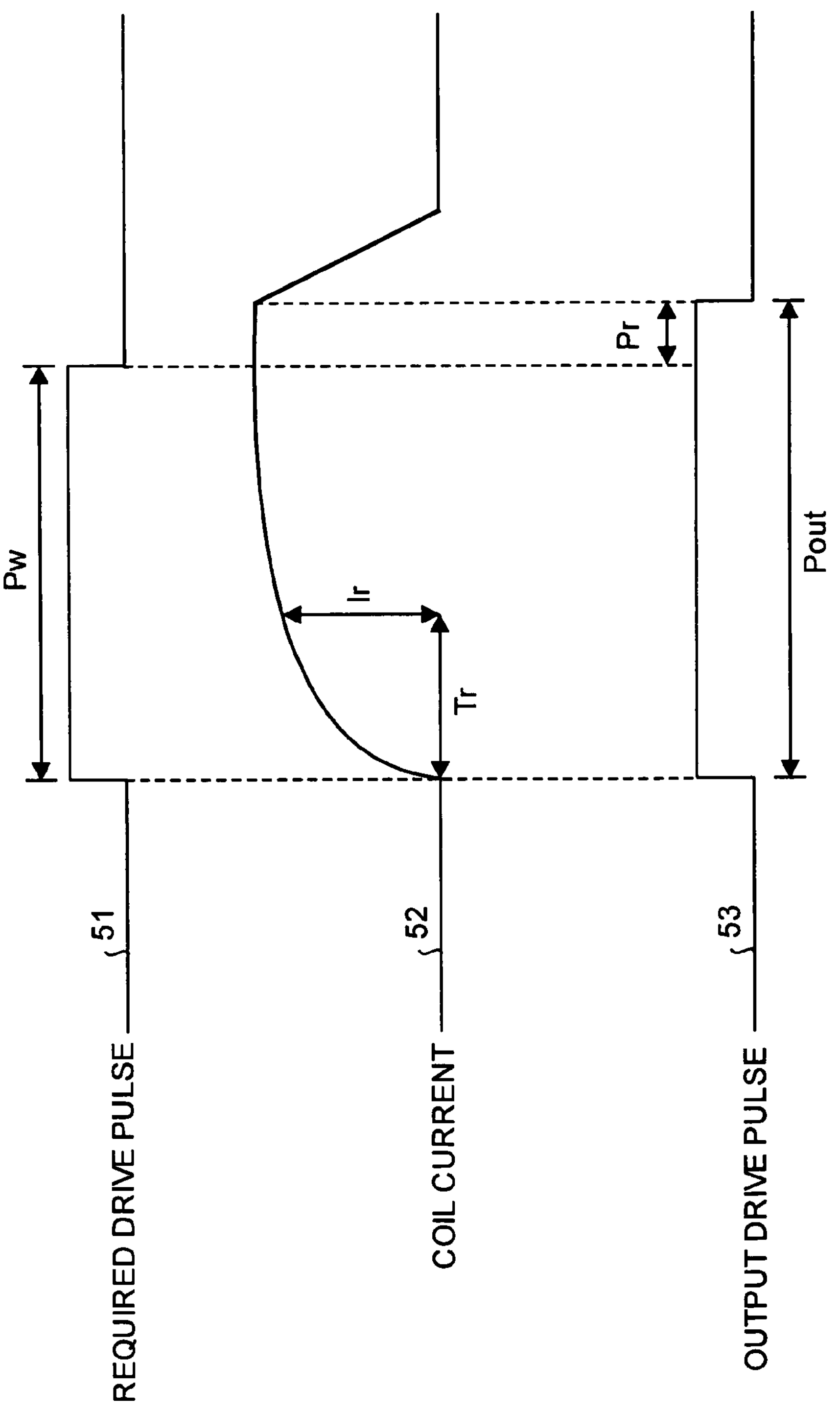
FIG. 3 is a waveform diagram illustrating each waveform of a required drive pulse, a coil current, and an output drive pulse in the electromagnetic fuel injection pump system applying the method of fuel injection according to the embodiment of the present invention.

Correction of the injection amount from the electromagnetic fuel injection pump thus configured is briefly explained. The coil current at the time of driving the solenoid 16 for fuel injection is detected and, based on the detected value, the on-time period of the FET 14 is adjusted to correct the drive pulse width. FIG. 3 is a waveform diagram for explaining the correction principle of the drive pulse width. FIG. 3 illustrates waveforms of a drive pulse required in view of a required amount of fuel injection (hereinafter, "required drive pulse") 51; a coil current 52; and an actually output drive pulse 53 (hereinafter, "output drive pulse").

In FIG. 3, Pw denotes a pulse width of the required drive pulse 51, that is, a required drive pulse width for the solenoid. Tr denotes a predetermined time for detecting a value of the coil current 52 after the start of driving the solenoid 16, and Ir denotes the detected value of the coil current 52. Pr denotes a correction value for the pulse width derived from the detected value Ir of the coil current. Pout denotes a pulse width of the output drive pulse 53.

As shown in FIG. 3, the output drive pulse 53 rises in synchronization with the rising edge of the required drive pulse 51 and consequently the coil current 52 starts flowing. After the predetermined time Tr for the coil current detection (not particularly limited but at a time, for example, 2 milliseconds elapsed), the detected value Ir of the coil current 52 is detected. The correction value Pr for the pulse width can be derived from the detected value Ir and the required drive pulse width Pw. Based on the correction value Pr, the required drive pulse width Pw is corrected to the pulse width Pout that is actually supplied to the FET 14.

A relation among Ir, Pw and Pr has been found experimentally and stored in a non-volatile memory in the microcomputer 13.

Figure 4:
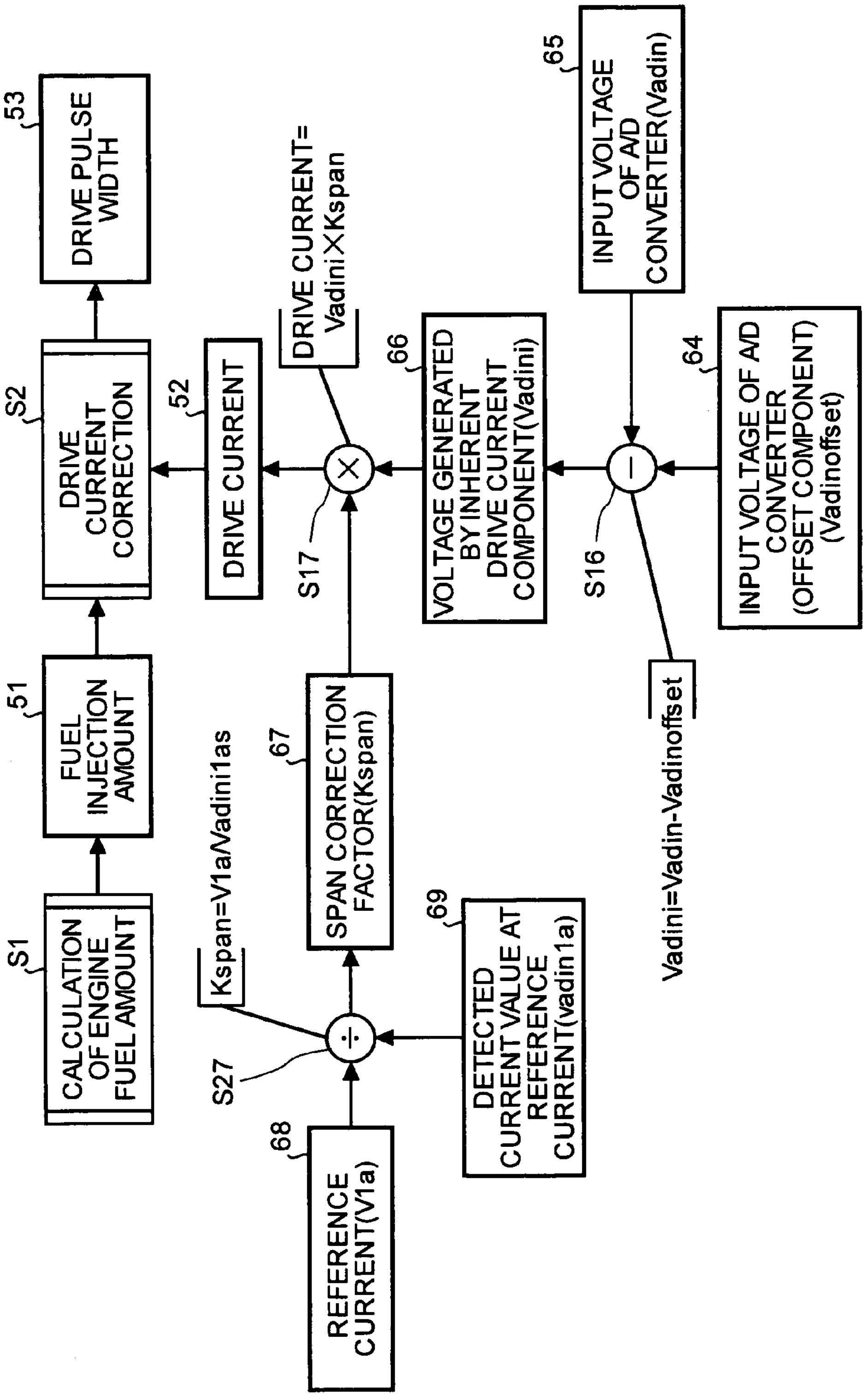
FIG. 4 is a flowchart illustrating the whole flow of data processing according to the offset correction.

Offset correction executed by the microcomputer 13 is explained next. FIG. 4 is a flowchart of the whole data processing according to the offset correction. Calculation of an engine fuel amount (Step S1) yields a fuel injection amount (the pulse width Pw of the required drive pulse 51). Then, through detection of the drive current (coil current) 52, drive current correction (Step S2) is executed to obtain the current-corrected drive pulse width (the pulse width Pout of the output drive pulse 53). The drive current 52 is subjected to the drive current correction (Step S2) after execution of the offset correction as described later.

Figure 5:
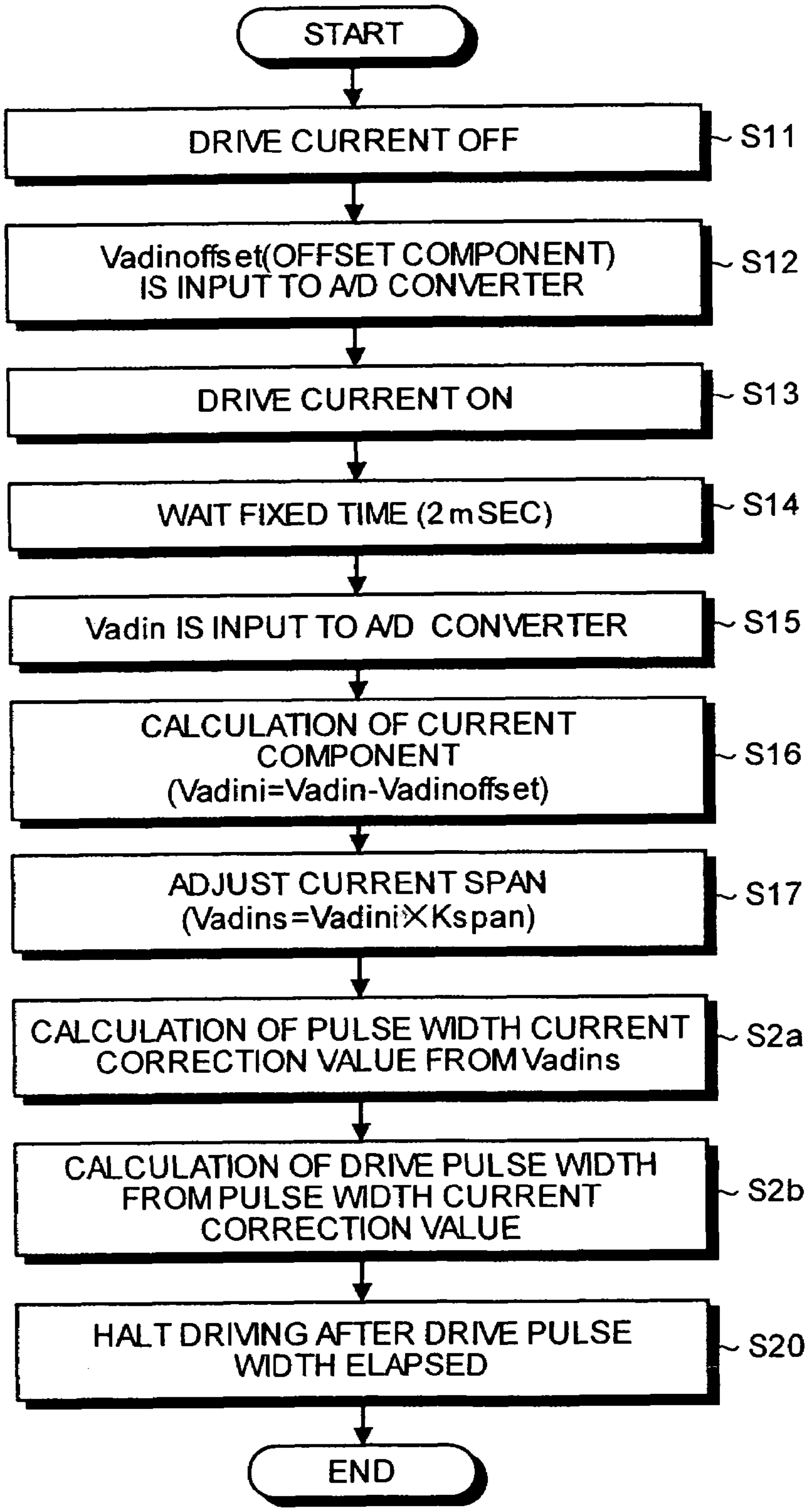
FIG. 5 is a flowchart illustrating drive current correction at the time of normal running.

FIG. 5 is a flowchart of drive current correction at the time of normal running. When the drive current of the output drive pulse 53 is OFF (Step 11), the detected current component (offset component Vadinoffset) 64 is fed to the A/D converter 26 to store this value in a memory (not shown) (Step 12).

Figure 6:
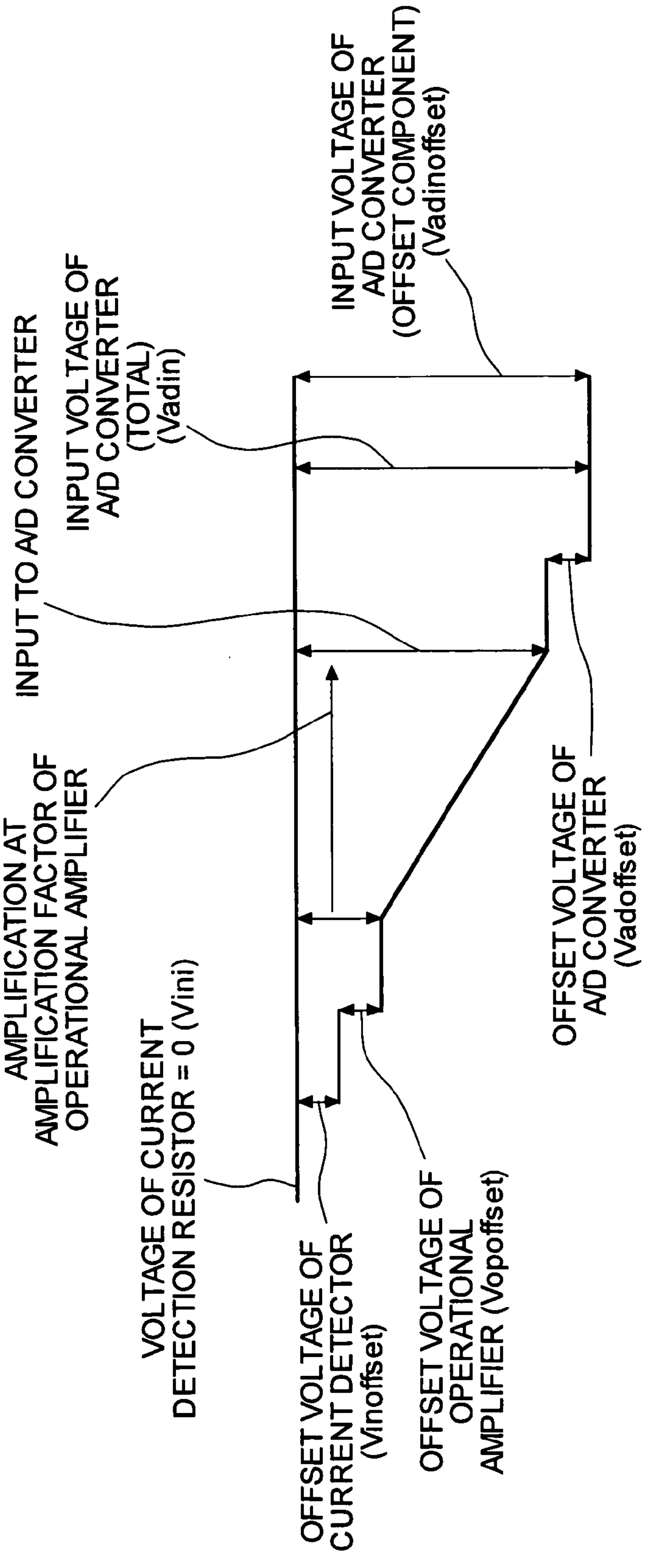
FIG. 6 is an illustrative view of offset voltages input to the A/D converter 26 when the drive current (coil current) is OFF.

FIG. 6 is a diagram for explaining offset voltages input to the A/D converter 26 when the drive current (coil current) is OFF. As shown, there are an offset voltage of the current detector 23 (Vinoffset); an offset voltage of the operational amplifier 25 (Vopoffset); and an offset voltage of the A/D converter 26 in the microcomputer 13 (Vadoffset). The offset voltage between the current detection resistor 22 and the current detector 23 (Vinoffset) and the offset voltage of the operational amplifier 25 in the current detector 23 (Vopoffset) increase according to the amplification factor of the operational amplifier 25. The voltage input to the A/D converter 26 (Vadin) includes all these offset components (Vadinoffset).

Figure 11:
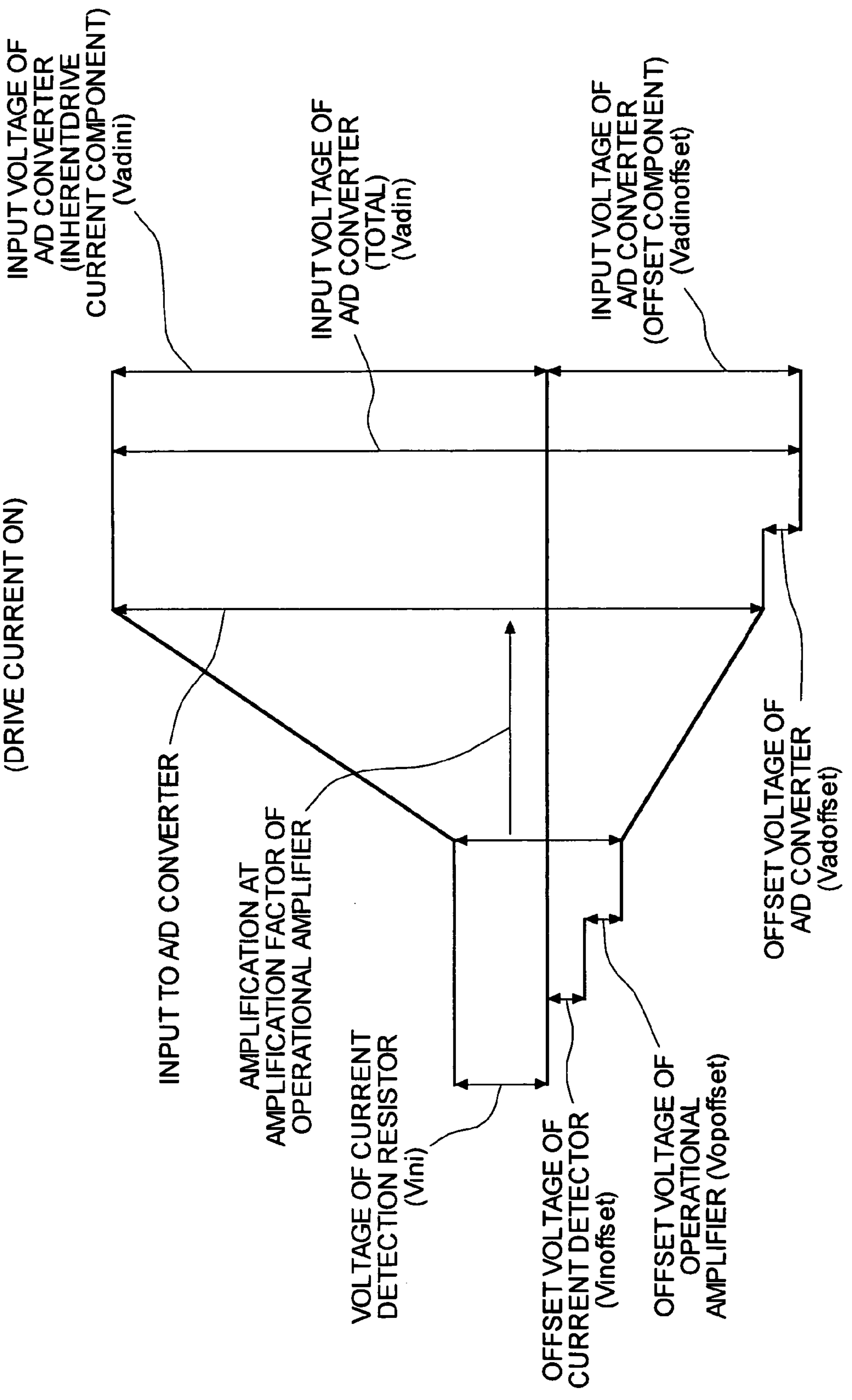
FIG. 11 is a diagram for explaining the influence of offset voltages on current detection.

Thereafter, the drive current is turned ON (Step S13), elapse of a fixed time period (the predetermined time Tr shown in FIG. 3) is waited (Step S14), and the input voltage (Vadin) 65 of the A/D converter 26 is detected (Step S15). Then, the voltage (Vadini) 66 generated by the inherent drive current component shown in FIG. 11 is calculated based on the voltage of the offset component (Vadinoffset) stored in the memory and the input voltage (Vadin) using the following equation (1) (Step S16).

$$Vadini = Vadin - Vadinoffset \quad (1)$$

Thereafter, based on a span correction factor (Kspan) 67 that is a certain factor previously stored in a memory, a current span is adjusted using the following equation (2) (Step S17).

$$Vadins = Vadini \times Kspan \quad (2)$$

The current span-adjusted value (Vadins) is output as the drive current 52 to the drive current correction (Step S2 in FIG. 4). In the drive current correction (Step S2), a pulse width current correction value is calculated (Step S2*a*) and then, based on the pulse width current correction value, a drive pulse width (Pout) is calculated (Step S2*b*), which is fed to the solenoid 16. When the time period corresponding to the drive pulse width (Pout) elapses after the start of driving, the output drive pulse 53 is turned OFF (Step S20).

According to the above offset correction, the offset components are detected when driving of the solenoid 16 is OFF. Therefore, during driving of the solenoid 16, the offset components are eliminated to calculate the drive pulse width accurately. The offset detection is executed in synchronization with driving of the solenoid 16 to detect the offsets for every halt on driving and to eliminate the offset components for every driving of the solenoid 16.

Calculation of a current span component is explained next. The offset-corrected drive current has not been corrected by the current span. The effect of span correction in an actual circuit is explained. An error of the current detection resistor (Ri) 22 dominantly effects on the span. If the error in the resistance is ±2%, the error directly appears as an error in the span. Accordingly, on adjusting a product board before shipment, for example, the correction factor for adjusting the span is measured and stored in a non-volatile memory. The correction factor is then read out to correct the current span of the drive current for the normal running.

Figure 7:
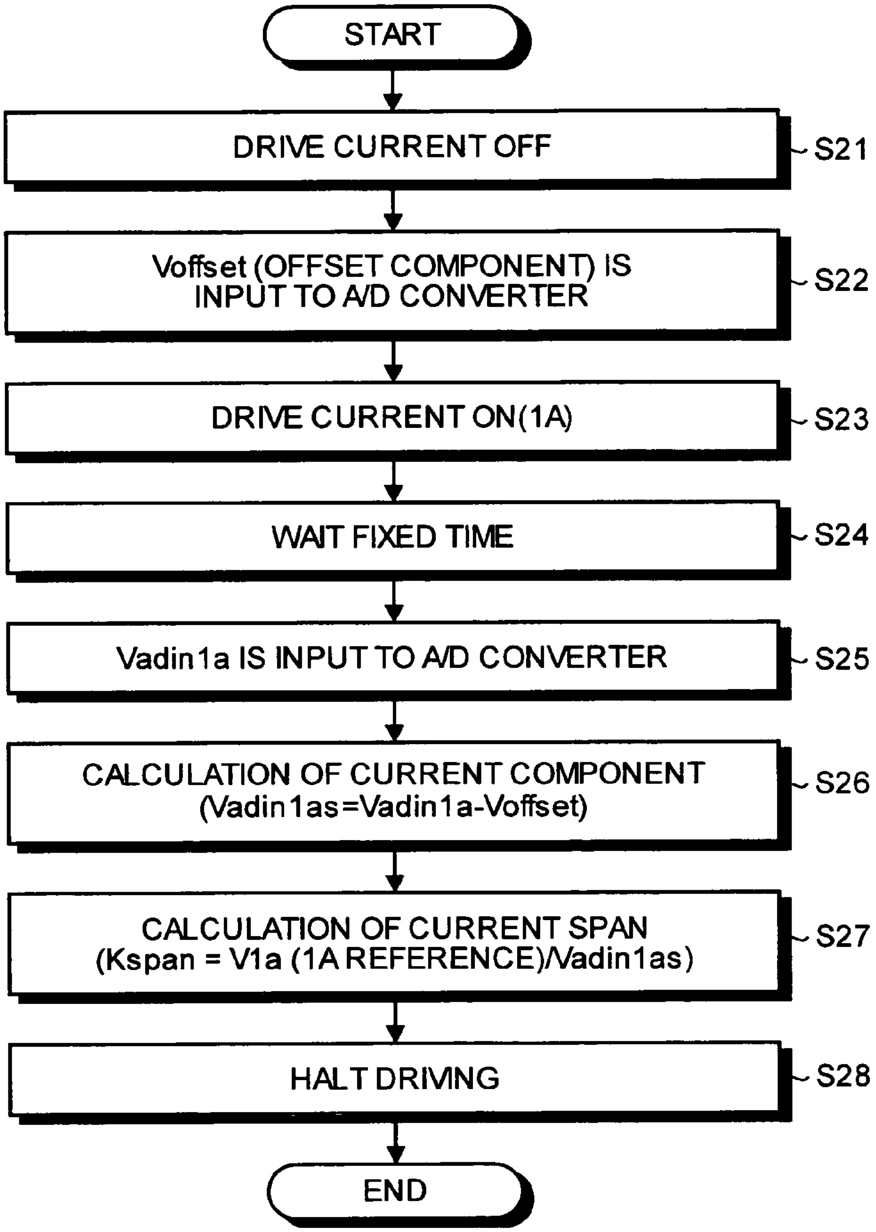
FIG. 7 is a flowchart illustrating calculation of the correction factor for the current span.
Figure 8:
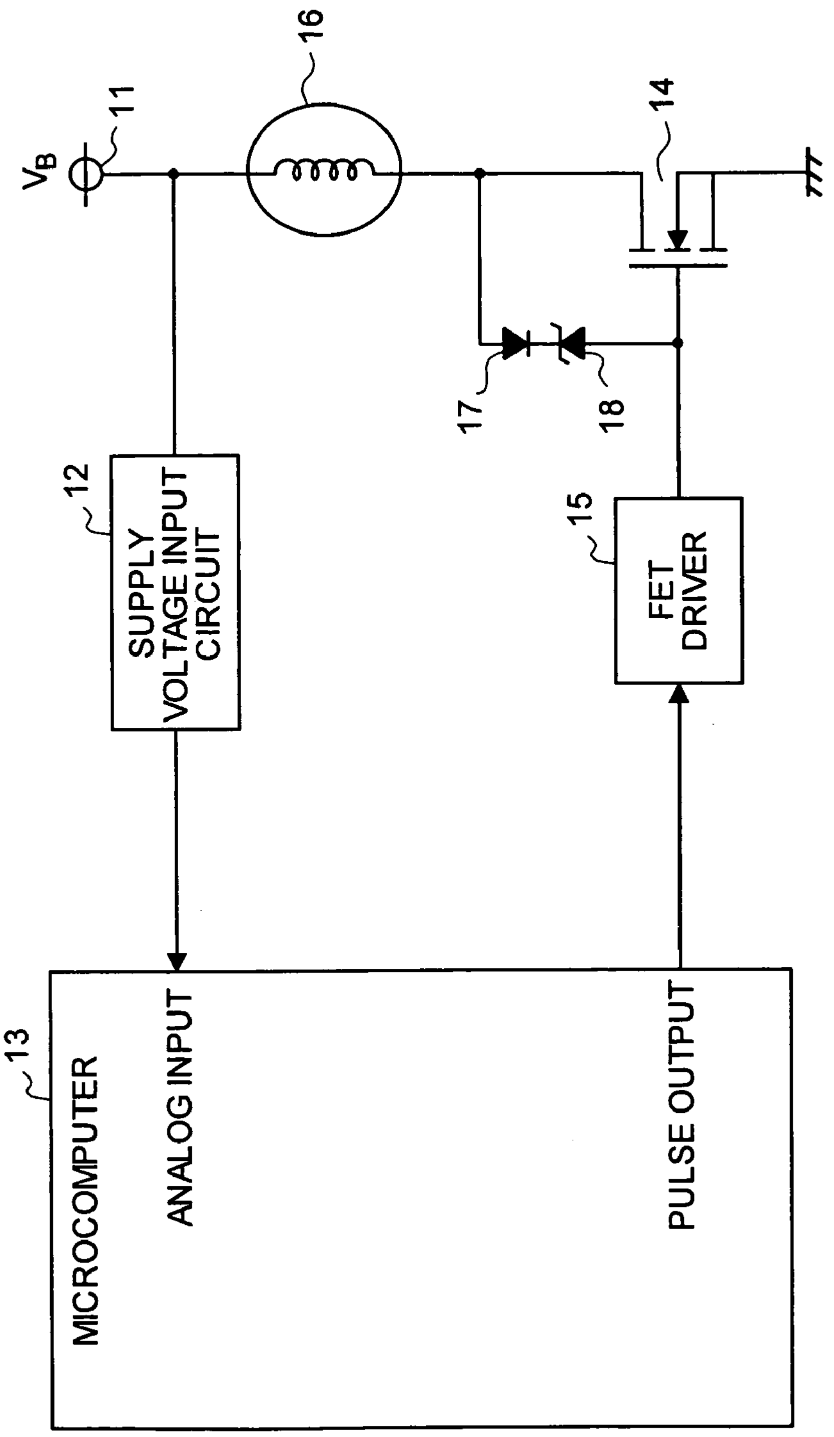
FIG. 8 is a diagram of a conventional correction control system in a fuel injector.
Figure 9:
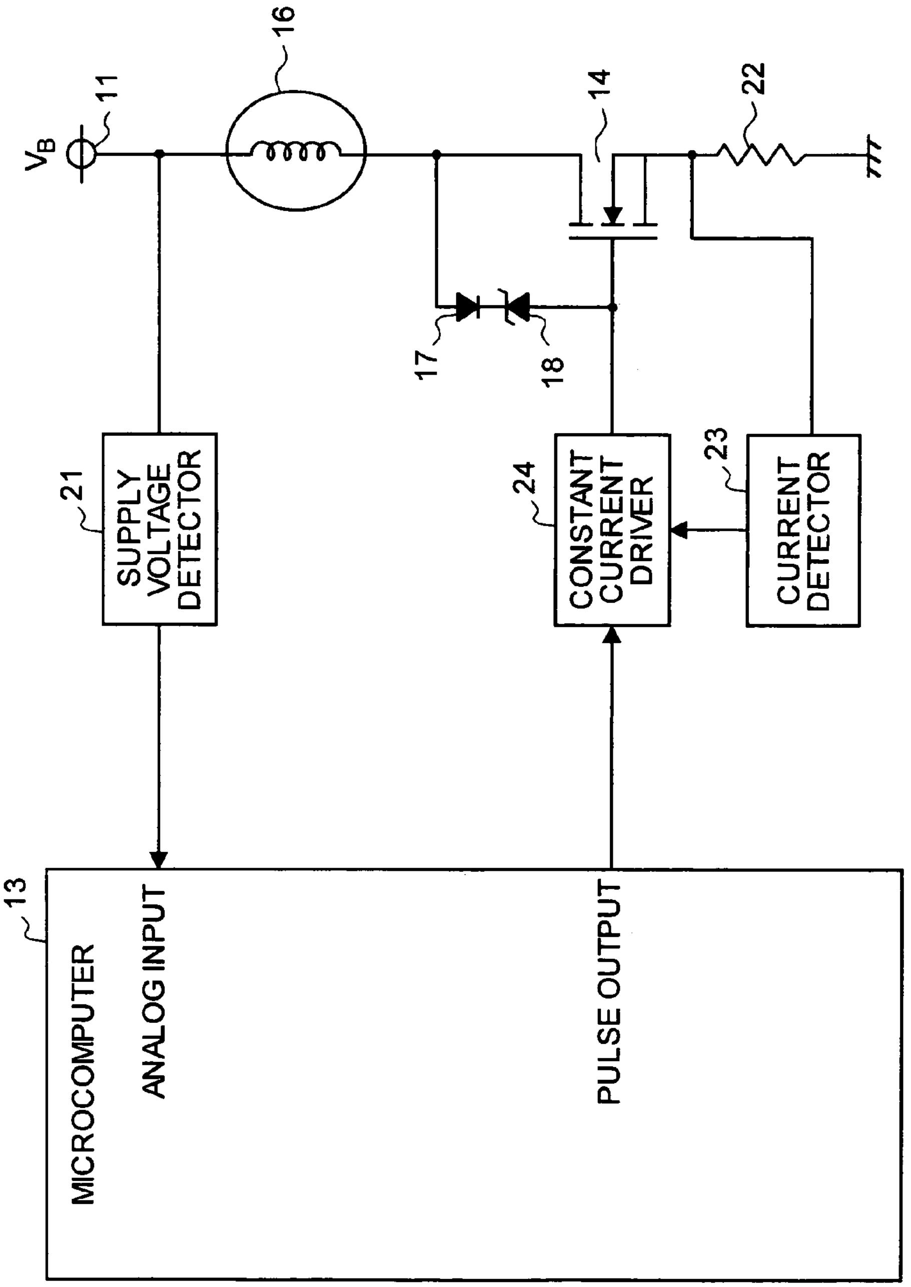
FIG. 9 is a diagram of a conventional constant current control system in a fuel injector.

FIG. 7 is a flowchart of calculation of the correction factor for adjusting the current span. When the drive current is OFF (Step S21), the value of the detected current component (the offset component Voffset) input to the A/D converter 26 is stored in a memory (not shown) (Step S22). Then, the drive current is turned ON with the reference current (V1*a*, see FIG. 4) 68 (Step S23). In this case, the drive current of, for example, 1 ampere is allowed to flow.

After waiting a certain time to elapse (Step S24), the input voltage (Vadin1*a*) 69 of the A/D converter 26 is detected (Step S25). Then, based on the offset voltage (Voffset) stored in the memory and the input voltage (Vadin1*a*), the drive current component (Vadin1*as*) is calculated using the following equation (3) (Step S26).

$$Vadin1as = Vadin1a - Voffset \quad (3)$$

Thereafter, based on the reference current (V1*a*) 68 and the result (Vadin1*as*) from the equation, the span correction factor 67 (coefficient) is calculated using the following equation (4) (Step S27).

$$Kspan = V1a / Vadin1a \quad (4)$$

The calculated span correction factor (Kspan) 67 is stored in a programmable memory such as an electrically erasable programmable read only memory (hereinafter, "EEPROM"). The span correction factor (Kspan) 67 is read out of the memory for the normal driving (Step 17 in FIG. 5) to adjust the current span.

Thus, the product board is adjusted in a production line before shipping the product. In this case, span correction factors can be programmed in a non-volatile memory such as the EEPROM to save span correction factors matched with different characteristics of respective products, improving the performance for eliminating offsets.

According to the embodiment of the present invention as described above, the current span factors suitable for the products can be determined and saved on shipping the products, and the offset components can be detected and stored when driving of the solenoid 16 is OFF. As a result, during driving of the solenoid 16, based on the current span factors and the offset components, an accurate drive pulse width can be calculated by eliminating the offset components from the detected current. The above processing is executed in synchronization with driving of the solenoid 16 to detect offsets for every halt on driving. Therefore, it can respond to voltage drifts and variations with time in the offset voltages to cancel them.

Figure 10:
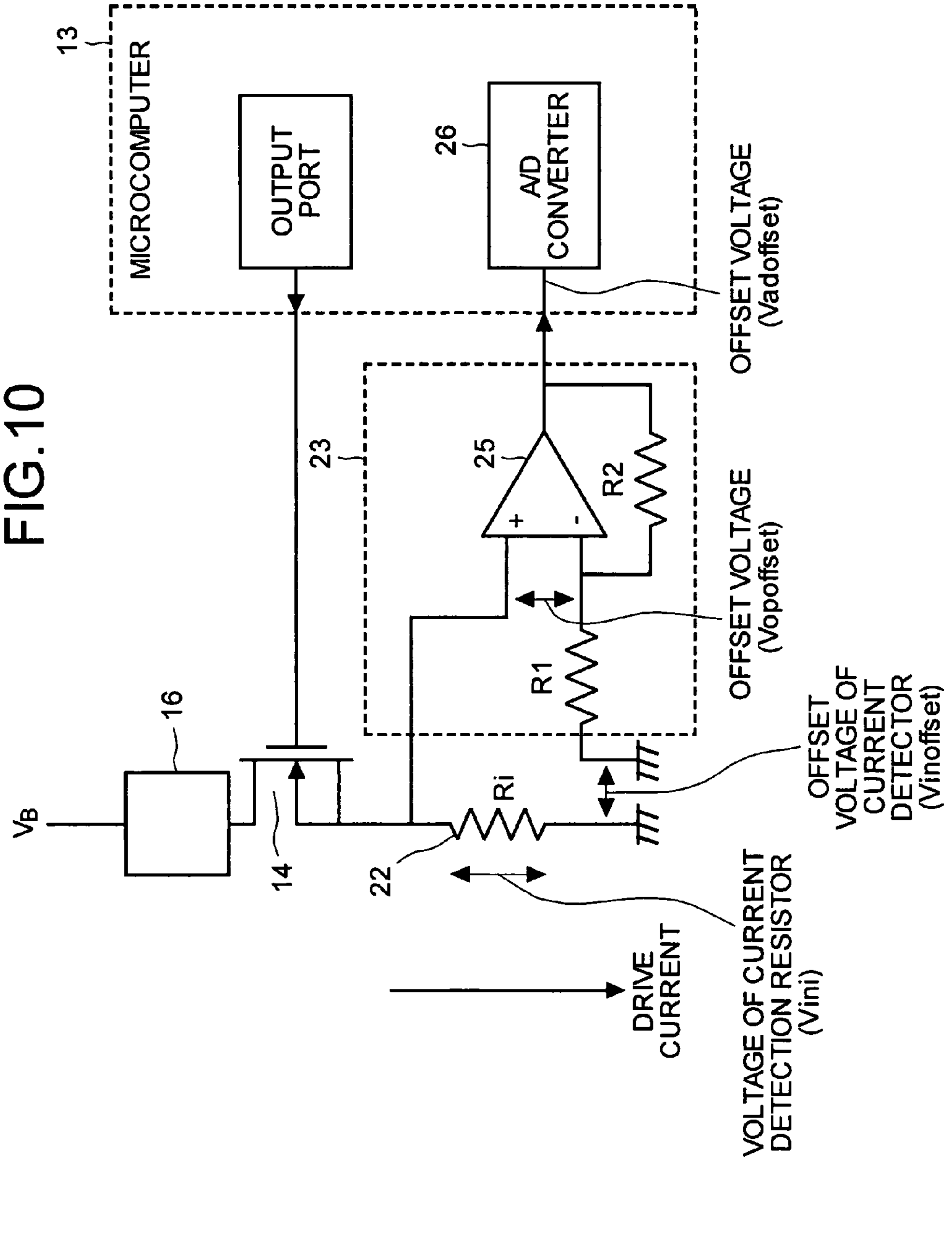
FIG. 10 is a diagram of an internal circuit of the current detector shown in FIG. 9.

Specific numerical values of the offset voltages in the above configuration are explained using the circuit diagram shown in FIG. 10. In an example, the offset voltage of the operational amplifier 25 (Vopoffset) is 7 mV, and the offset voltage of the A/D converter 26 in the microcomputer 13 (Vadoffset) is 20 mV. In this case, the voltage input to the microcomputer 13 (the voltage-converted value after A/D conversion by the A/D converter 26) is given by: Vd=Vini×(1+R2/R1)+7 mV×(1+R2/R1)±20 mV, where R1=1 kΩ, R2=18 kΩ, and a difference in potential (Vinoffset) of the current detector 23=0.

When Idcp denotes the drive current (coil current), then: Vini=Idep×Ri, where R1=the resistance of the current detection resistor 22=22 mΩ.

The drive current and the voltage-converted value Vd input to the A/D converter 26 have the numeric values as indicated in the following Table 1.

TABLE 1

| Idcp (A) | Vd (V) | Offset voltage (V) | Error (%) |
|---|---|---|---|
| 2.0 | 0.836 | ±0.153 | ±18.3 |
| 3.0 | 1.254 | ±0.153 | ±12.3 |
| 4.0 | 1.672 | ±0.153 | ±9.2 |
| 6.0 | 2.504 | ±0.153 | ±6.2 |

When the offset correction is executed with the calculated values shown in the table, the offset voltages are input as the voltage when the solenoid 16 is OFF, and cancelled through arithmetic processing in the microcomputer 13 (offset elimination) to reduce the error to zero.

INDUSTRIAL APPLICABILITY

According to the present invention, when the drive pulse width applied to the solenoid for fuel injection is corrected, the current flowing through the solenoid during halts on driving the solenoid is detected as the offset component to correct the offset on driving of the solenoid. This configuration is effective to eliminate the offset voltage of the operational amplifier in the current detector and to correct the drive pulse width accurately based on an accurate current.

The above invention can eliminate the drifts due to temperature and so forth varying with time if it detects the offset for every halt on driving the solenoid. In addition, by the previous calculation of the current span correction factor, for example, on adjusting the board, the above invention can determine an appropriate current span matched with characteristics of respective products to correct the drive pulse width more accurately.

The invention claimed is:

1. A fuel injection method for a fuel injection system including a solenoid that is driven by a drive pulse and a resistor for detecting a current flowing through the solenoid, comprising:

pre-detecting a first current flowing through the resistor when the drive pulse is OFF;

detecting a second current flowing through the resistor when the drive pulse is ON;

calculating a difference between the first current and the second current; and adjusting a width of the drive pulse based on the difference calculated.

2. The fuel injection method according to claim 1, further comprising correcting the difference based on a predetermined correction factor, wherein the adjusting includes adjusting the width of the drive pulse based on the difference corrected.

3. The fuel injection method according to claim 1, wherein the pre-detecting includes pre-detecting the first current every time the drive pulse is turned OFF so that the width of the drive pulse is corrected every time the drive pulse is turned ON.

4. The fuel injection method according to claim 2, further comprising calculating the correction factor based on currents that are respectively detected before and after flowing a predetermined current through the solenoid.

5. The fuel injection method according to claim 4, further comprising storing the correction factor calculated in a rewritable storage unit.

* * * * *